June 30, 1964
L. SCHINDEL
3,138,993
ARMORED VEHICLE CONSTRUCTION
Filed Dec. 24, 1962
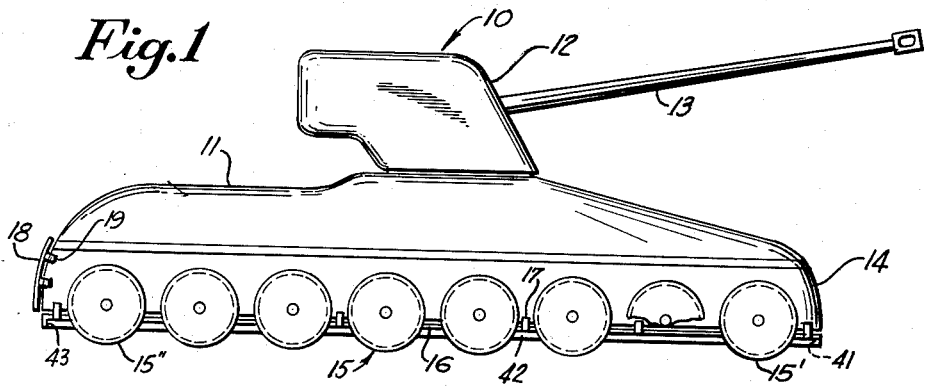
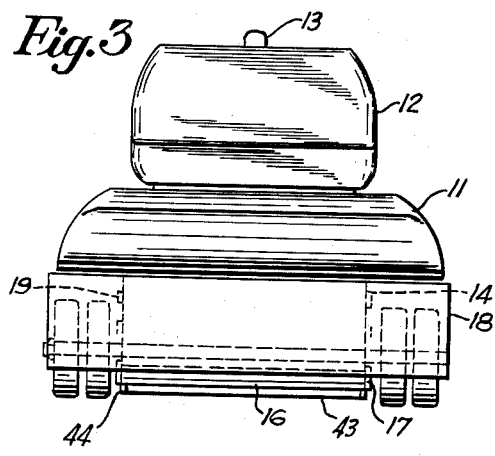
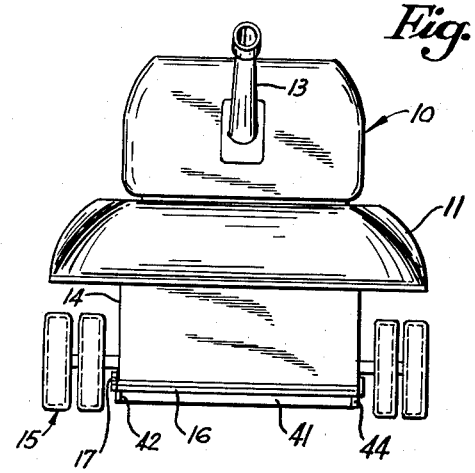
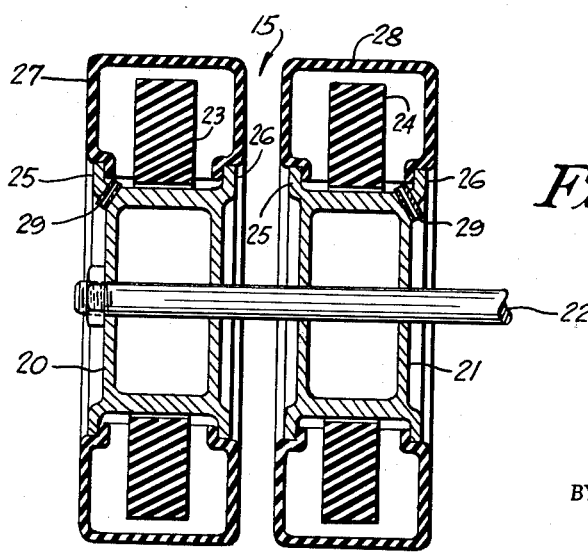
INVENTOR.
LEWIS SCHINDEL
BY Richards & Geier
ATTORNEYS

United States Patent Office 3,138,993
Patented June 30, 1964

3,138,993
ARMORED VEHICLE CONSTRUCTION
Lewis Schindel, 80 Wall St., New York, N.Y.
Filed Dec. 24, 1962, Ser. No. 246,704
1 Claim. (Cl. 89—36)

This invention relates to armored vehicle construction and refers more particularly to splinter shields for protecting the underside and rear end of armored vehicles, and to means for increasing the mobility of these vehicles.

In my U.S. Patent No. 2,726,577 issued December 13, 1955, there is described the use of stationary or vertically movable side shields, and a front shield for use on military tanks for increasing their ability to withstand the effects of anti-tank gunfire. It is apparent, however, that this and other prior art military tank constructions leave unsolved the problem of protecting two other highly vulnerable areas of the tank. In the first instance, the underside of the tank is very susceptible to damage from land mine explosions, the particular hazard being that such an explosion may damage the transmission, drive differentials, etc., and render the tank inoperative. In the second instance, the rear of the tank which generally houses the drive engine, has little or no protection so that a hit in that area usually results in severe damage to the drive engine making the tank useless for continued action.

It is, therefore, a primary object of the present invention to make armored vehicles less vulnerable to the effects of anti-tank gunfire ad land mine explosions.

Another object is to provide armored splinter shields for the underside and rear of armored vehicles.

Still another object is to provide armored splinter shields for the underside and rear of armored vehicles which are easily installed on and removed from the vehicle body.

A further object is to provide pneumatic wheels for armored vehicles in lieu of prior art track type treads.

A still further object is to provide pneumatic wheels for armored vehicles which in use will continue to support the vehicle in the event they are punctured by anti-tank gunfire.

Other objects of the present invention will become apparent in the course of the following specification.

The aforementioned objectives of the present invention may be achieved by providing the underside of the armored vehicle with a splinter shield comprising a sheet of armor plate connected with the tank body by means of lugs or clips and supported in spaced relation with the bottom of the armored vehicle. The splinter shield covers the entire underside of the vehicle so that the transmission housing, differentials, etc. are protected from the fragments of land mine explosions. In addition, a splinter shield is connected with the rearside of the armored vehicle and serves to protect the rear of the vehicle from the damaging effects of anti-tank shells, missiles, etc.

According to the invention, the armored vehicle may be provided with pneumatic tires in lieu of track type treads. In this manner, the vehicle is capable of higher speeds and greater mobility than heretofore possible. The tires are arranged in pairs at each side of the vehicle, each side being provided with a plurality of pairs. Each pneumatic tire includes an inner solid rubber tire of slightly less diameter than the pneumatic outer tire so that if the latter is punctured, the vehicle will continue to operate on the solid inner tire.

The invention will appear more clearly from the following detailed description when taken in conjunction with the accompanying drawing showing by way of example, preferred embodiments of the inventive concept.

In the drawings:

FIGURE 1 is a side elevational view of an armored vehicle equipped with underside and rear end splinter shields and pneumatic tired wheels in accordance with the principles of the present invention.

FIGURE 2 is a front end view of the armored vehicle shown in FIGURE 1.

FIGURE 3 is a rear end view of the armored vehicle.

FIGURE 4 is a vertical sectional view of a dual wheel assembly for use on the armored vehicle and illustrates the use of a solid inner tire within the pneumatic outer tire.

Throughout the specification, like reference numerals are used to indicate like parts.

As used in the specification, the term "armored vehicle" is intended to denote armored military vehicles such as the tank shown in FIGURES 1 to 3, armored personnel carriers, self-propelled gun vehicles, scout cars, tractors and the like.

The military tank 10 illustrated in FIGURE 1, generally comprises a chassis having an upper tank body 11, a turret 12 housing a medium caliber gun 13 and a lower tank body 14, the latter being the space wherein is mounted the drive engine, vehicle transmission, differentials, etc. In prior art vehicles of this type, the lower tank body 14 is generally supported on track type treads or "crawler assemblies" (not shown). The present invention, however, contemplates the use, in lieu of said treads or crawler assemblies, of a number of dual wheel assemblies 15 which will be described in greater detail later on in the specification.

The underside of lower tank body 14 is particularly vulnerable to the effects of land mine explosions. For example, steel fragments can easily penetrate the lower tank body and smash gears in the vehicle transmission, thereby rendering the vehicle inoperative. To reduce the hazards to the underside of lower tank body 14, it is provided with a splinter shield 16 which is made of armored plate of a known and suitable material. The splinter shield 16 covers the entire under surface of the lower tank body and is removably connected thereto by means of lugs or clip members 17. The lugs 17 are preferably connected with the splinter shield and the lower tank body by means of welding although other fastening means may be used. The lugs maintain the splinter shield in spaced relation with the underside of the lower tank body as seen in the drawings. One of the advantages of welding the lugs to the lower tank body is that field installation and removal of the splinter shield is simplified. Thus, if the splinter shield is damaged by a land mine it may be easily removed from the tank by burning off the lugs and a new shield welded in place. The number of lugs 17 required for connecting the splinter shield 16 may be easily determined according to their individual size and the weight of the splinter shield.

The splinter shield 16 is provided with a downwardly directed skirt which comprises depending skirt plates 41, 42, 43 and 44, extending around the perimeter of the splinter shield. These skirt plates are also of armored material and extend downwardly of the splinter shield for a short distance, for example, six inches. They thus provide additional protection for the inner surfaces of the wheel assemblies 15.

A rear end splinter shield 18 is provided for protecting the rear of the tank 10. Like splinter shield 16, it is also removably connected to the lower tank body 14 by means of lugs 19. It is preferable that the rear end splinter shield generally conform to the rear contour of the tank body inasmuch as it increases the ricochet characteristics of the splinter shield for deflecting projectiles, etc.

As was previously stated, the present invention contemplates the substitution of a number of dual wheel assemblies 15 on each side of the tank in place of the prior art track type treads. Referring to FIGURE 1, a plurality of assemblies may be utilized, the exact number being determined by the weight to be supported by the wheels, the size of the wheels, etc. Several of the wheel assemblies 15′, 15″ may be positively driven in a known manner. The remaining wheel assemblies may be merely idler wheels. Furthermore, resilient suspension devices (not shown) may be incorporated with the wheel assemblies to permit travel over uneven surfaces.

As shown in FIGURE 4, each dual wheel assembly 15 comprises a pair of steel wheel rims 20 and 21 arranged in spaced alongside relation on a driving or an idler axle 22. The wheel rims 20 and 21 support, respectively, solid rubber inner tires 23 and 24. The solid rubber tires may be mounted on the wheel rims in a known manner as, for example, by use of an adhesive. Each wheel rim is provided with peripheral flanges 25 and 26 for retaining outer pneumatic tires 27 and 28. Each wheel rim is also provided with an air valve 29 for inflating the tires with air under pressure in the usual manner. The outer pneumatic tires 27 and 28 are only slightly larger in diameter than the inner solid tires 23 and 24, respectively. In use the pneumatic tires are filled with sufficient air to support the tank 10 for rapid movement over the ground. On the other hand, if at any time the pneumatic tires are punctured by gunfire, they will deflate but proper support for each wheel will not be lost as the solid tires will take over and support the tank. Thus, little speed and mobility is lost due to punctured outer tires.

It is seen, therefore, that the present invention provides splinter shield protection for heretofore extremely vulnerable areas on armored military vehicles. Furthermore, rubber tire assemblies are used instead of track type treads which features give the vehicle greater speed and mobility than was heretofore possible. In addition, the use of the rubber tire assemblies helps to reduce damage to roads and streets when tanks are transiting these surfaces for peaceful purposes, as for example, during military parades.

It should be apparent that the tire assemblies may be protected with movable side shields and a front end shield in the manner described in the previously mentioned U.S. Patent No. 2,726,577.

While there is above disclosed but some embodiments of armored vehicle construction, it is possible to produce still other embodiments without departing from the scope of the inventive concept herein disclosed.

What is claimed is:

In an armored military vehicle having a self-propelled chassis, the improvements which comprise:
  a splinter shield of armor plate for covering the undersurface of said chassis;
  lugs carried by said splinter shield, and connected with said chassis for supporting said splinter shield from said chassis spaced from the undersurface thereof, said splinter shield having a downwardly depending skirt extending around the perimeter thereof; and
  another splinter shield of armor plate supported at the rear of said chassis, said other splinter shield having a shape which is the same as the rear end contour of said chassis, and being spaced a distance from the rear of said chassis.

References Cited in the file of this patent
UNITED STATES PATENTS

| | | |
|---|---|---|
| 1,002,169 | McSweeney | Aug. 29, 1911 |
| 1,136,605 | Lobato | Apr. 20, 1915 |
| 2,074,284 | Stevenson | Mar. 16, 1937 |
| 2,376,331 | Abrams | May 22, 1945 |
| 2,751,959 | Blomquist | June 26, 1956 |